UNITED STATES PATENT OFFICE.

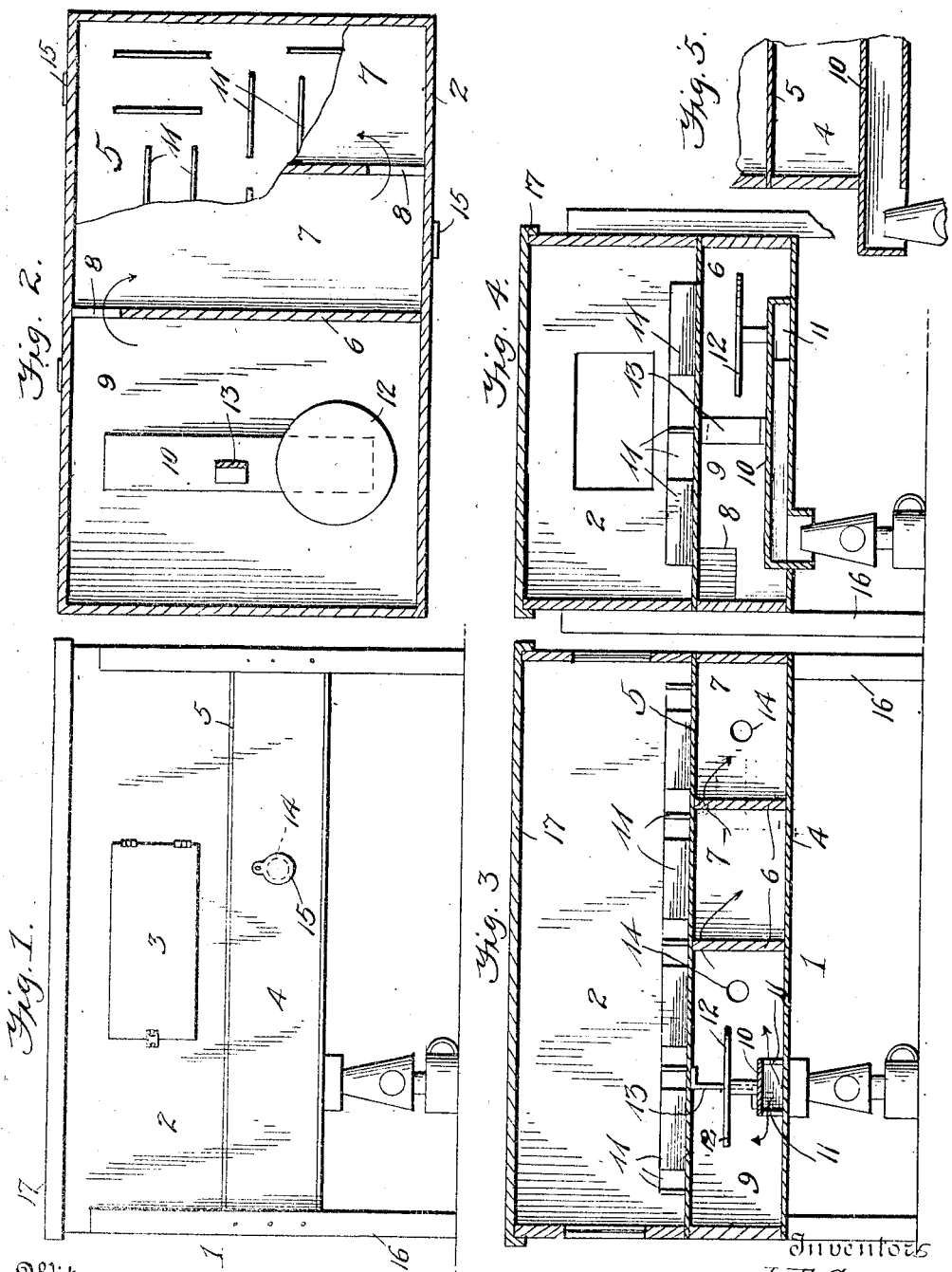

JOHN F. CRAIG AND WILLIAM D. CRAIG, OF OAKLAND, ILLINOIS; SAID WILLIAM D. CRAIG ASSIGNOR TO SAID JOHN F. CRAIG.

BROODER.

No. 913,813.　　　　Specification of Letters Patent.　　　Patented March 2, 1909.

Application filed August 3, 1908. Serial No. 446,721.

*To all whom it may concern:*

Be it known that we, JOHN F. CRAIG and WILLIAM D. CRAIG, citizens of the United States, residing at Oakland, in the county of Coles and State of Illinois, have invented certain new and useful Improvements in Brooders; and we do declare the following to be a full, clear, and exact description of the invention, such as will enable others skilled in the art to which it appertains to make and use the same.

This invention relates to improvements in brooders.

The object of the invention is to provide an improved construction of brooder in which the brooding compartment is arranged above and entirely separate from the heating chamber.

A further object is to provide means whereby the different parts of the brooding compartment will be heated to different temperatures, thus permitting the chicks to select a place having a temperature they desire.

With these and other objects in view, the invention consists of certain novel features of construction, combination and arrangement of parts as will be described and particularly pointed out in the appended claims.

In the accompanying drawings, Figure 1 is a side elevation of a brooder constructed in accordance with the invention; Fig. 2 is a horizontal section through the heating compartment of the brooder showing a portion of the floor of the brooding compartment. Fig. 3 is a longitudinal vertical sectional view of the brooder taken on a line through the discharge openings of the heat conducting tube; Fig. 4 is a transverse vertical sectional view through the brooder taken on a line through the heat conducting tube; and Fig. 5 is a detail sectional view through one end of the heating compartment and the heat conducting tube, showing a modified arrangement of the latter.

Referring more particularly to the drawings, 1 denotes the brooder, which consists of an upper brooding compartment 2, having in one side a door, 3, and a lower heating chamber or compartment, 4, which is arranged immediately below the brooding compartment and is entirely separated therefrom by a sheet metal partition, 5, which forms the floor of the brooding compartment.

In the heating compartment or chamber is arranged a series of transversely disposed partitions, 6, which separate the heating compartment into a series of heat passages, 7. In the upper portion of the partition, 6, adjacent to one end of the same is formed an opening, 8, said opening being provided for the passage of heat from one heat passage to the other, said openings forming communication between the heat passages, 7, whereby the heat from one of said passages enters the other. The openings, 8, are arranged at the opposite end of each alternate partition, 6, thus providing for a circuitous or zig-zag passage of the heat through the compartment, 4.

At one end of the heating compartment, 4, between said end and the adjacent partition, 6, is formed a heat inlet chamber, 9, in which is arranged a transversely disposed heat conducting tube, 10, said tube being here shown and is preferably of flat, oblong shape and has one end thereof projecting through the bottom of the heating compartment, where it is adapted to receive the upper end of the lamp chimney, by means of which the compartment is heated. The lower side of the tube is preferably formed by the bottom of the compartment, 4, said bottom being constructed of sheet metal.

In the side walls of the tube, 10, adjacent to its inner end are formed oppositely disposed heat discharging passages, 11, through which the heat from the lamp enters the chamber, 9, and from thence passes through the openings, 8, and heat passages, 7, to the opposite end of the heating compartment, 4. Arranged above the discharge passages, 11, of the heat tube and suitably secured to the latter by a supporting bracket is a heat deflecting plate, 12, which receives the heat from the passages, 11, and causes the same to radiate in different directions in the chamber, 9.

The sheet metal partition, 5, which forms the bottom of the brooding compartment is supported at one end of the heating compartment by the transverse partitions, 6, while over the chamber, 9, the partition is preferably supported by means of a bracket, 13, which is secured at its lower end to the upper side of the heat tube, 10. It has been found necessary to support this end of the sheet metal partition to prevent the same from being vibrated by the chicks passing thereover, as the vibrations of the partition would cause the air in the chamber, 9, to extinguish the light of the heating lamp.

In the side walls of the heating compartment at the end of each of the passages, 7, and in the heating chamber, 9, are formed heat discharging openings, 14, by means of which the temperature in the various compartments may be regulated. The openings, 14, are covered by pivoted valve plates, 15, which are adapted to open and close the openings, 14, when desired.

In Fig. 5 of the drawings is shown a slightly modified arrangement of the heat conducting tube and its connection with the heating lamp. In the form shown in Fig. 5, the heating tube is extended through one side of the heating compartment, and said extended end is connected with the heating compartment, whereby the heat is brought into the chamber, 9, through the side of the heating compartment instead of through the bottom, as shown in the first figures of the drawing. On the sheet metal partition, 5, which forms the floor of the brooding compartment is arranged a series of upwardly projecting plates, 11, which are so arranged as to provide a passage between each end of the plates and adjacent plates or sides of the brooding chamber. The plates, 11, are provided to prevent the chicks from crowding one another, and, at the same time, the plates will not interfere with the free movement of the chicks in the brooding chamber. By the provision of the plates, 11, the weaker chicks will be protected from being crowded and smothered by the stronger chicks.

A brooder constructed in accordance with our invention has the brooding compartment separate entirely from the heating compartment so that the heated air or fumes from the lamp cannot possibly enter the brooding compartment, said compartment being heated entirely from the heat in the chamber below, the latter being so arranged as to provide for a graduation of the heat from one end to the other, thus enabling the chicks to select a place having the desired temperature. The brooder may be provided with any suitable support, and is here shown as having legs, 16, arranged at each corner and projecting upwardly above the heating compartment to form standards which hold the upper brooding compartment in place upon the heating compartment. The upper side of the brooding compartment may, if desired, be provided with a removable cover, 17.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described our invention, what we claim as new and desire to secure by Letters-Patent, is:

1. In a brooder, a brooding compartment, a heating compartment arranged below and entirely separate from said brooding compartment, a sheet metal partition between said compartments, said partition forming a bottom for the brooding compartment, a series of transverse partitions arranged in said heating compartment, said partitions having formed therein air passages, said passages being arranged at opposite ends in the adjacent partition, a heat conducting tube arranged in one end of said heating compartment, said tube having a heat inlet adapted to be connected with the heat supply, and a heat deflecting plate arranged over the inner discharge end of the tube.

2. In a brooder, a brooding compartment, a heating compartment arranged beneath said brooding compartment, a series of transverse partitions arranged in said heating compartment to divide the same into a series of heat passages which communicate with each other at their opposite ends, and each of which is provided with a heat discharge opening, a valve plate to open and close said discharge opening, and a heat-conducting tube arranged in one end of the heating compartment.

3. In a brooder, a brooding compartment, a plurality of pairs of short upwardly projecting plates, certain of the pairs arranged at right angles to the others on the floor of said compartment to provide oppositely disposed passages whereby the chicks are prevented from crowding one another.

4. In a brooder, a brooding compartment, a heating compartment arranged beneath and entirely separate from said brooding compartment, means to distribute heat through the heating compartment, and a plurality of pairs of plates arranged on the floor of the brooding compartment to prevent the chicks from crowding, certain of said pairs being arranged at right-angles to other pairs, for the purpose described.

In testimony whereof we have hereunto set our hands in presence of two subscribing witnesses.

JOHN F. CRAIG.
WILLIAM D. CRAIG.

Witnesses:
JAMES W. RIEDS,
GEO. W. KIRKPATRICK.